US008072549B2

(12) United States Patent
Inoue et al.

(10) Patent No.: US 8,072,549 B2
(45) Date of Patent: Dec. 6, 2011

(54) REPEATER APPARATUS TO PROVIDE A SOURCE APPARATUS WITH FORMAT INFORMATION THAT CAN BE PROCESSED BY BOTH A SINK APPARATUS AND THE REPEATER APPARATUS AND METHOD FOR CONTROLLING THE SAME

(75) Inventors: Yoshifumi Inoue, Osaka (JP); Masahiko Mizoguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1231 days.

(21) Appl. No.: 11/720,026

(22) PCT Filed: Nov. 25, 2005

(86) PCT No.: PCT/JP2005/021645
§ 371 (c)(1),
(2), (4) Date: May 23, 2007

(87) PCT Pub. No.: WO2006/057324
PCT Pub. Date: Jun. 1, 2006

(65) Prior Publication Data
US 2008/0080596 A1    Apr. 3, 2008

(30) Foreign Application Priority Data

Nov. 25, 2004    (JP) .................................. 2004-340221

(51) Int. Cl.
*H04N 5/38*    (2006.01)
*H04N 7/00*    (2011.01)
*H04N 7/18*    (2006.01)

(52) U.S. Cl. ........ 348/723; 348/552; 386/230; 386/231; 725/80

(58) Field of Classification Search .................. 348/552, 348/553, 723, 738; 386/230, 231; 710/11, 710/14, 100, 300, 105, 106; 345/501.52, 345/506; 381/58, 306; 725/80, 131–133, 139–141, 151–153; 375/211, 219, 220
See application file for complete search history.

(56) References Cited

U.S. PATENT DOCUMENTS
5,910,806  A    6/1999  Narui et al.
(Continued)

FOREIGN PATENT DOCUMENTS
JP          9-128330          5/1997
(Continued)

OTHER PUBLICATIONS
Korean Office Action dated Apr. 7, 2008 with English Translation.
(Continued)

*Primary Examiner* — Victor Kostak
(74) *Attorney, Agent, or Firm* — Dickinson Wright PLLC

(57) ABSTRACT

In a home theater system having a source apparatus, a repeater apparatus and a sink apparatus connected in the recited order, when connected to a sink apparatus, whatever type it is, the repeater apparatus provides the source apparatus with video and audio signal format information that allows correct transmission. A control part 210 of the repeater apparatus 200 reads EDID information from memory 321 of the connected sink apparatus 300, and analyzes video and audio signal formats that can be processed by the sink apparatus 300, and when any format that cannot be handled by the repeater apparatus 200 itself is included, the repeater apparatus deletes information concerning that format to reconstruct the EDID information, and stores the reconstructed information into memory 221 in order to cause the source apparatus 100 to reference the stored information as EDID information of the repeater apparatus itself.

8 Claims, 5 Drawing Sheets

U.S. PATENT DOCUMENTS

| | | | |
|---|---|---|---|
| 7,197,070 B1 * | 3/2007 | Zhang et al. | 375/240.01 |
| 2001/0006375 A1 | 7/2001 | Tomooka et al. | |
| 2001/0050679 A1 | 12/2001 | Shigeta | |
| 2003/0002583 A1 * | 1/2003 | Geerlings | 375/240.12 |
| 2003/0185400 A1 | 10/2003 | Yoshizawa et al. | |
| 2004/0046707 A1 | 3/2004 | Mori et al. | |
| 2004/0046772 A1 | 3/2004 | Ouchi et al. | |
| 2005/0053159 A1 * | 3/2005 | Sugimoto | 375/240.26 |
| 2005/0228995 A1 * | 10/2005 | Kwak et al. | 713/168 |
| 2007/0097130 A1 * | 5/2007 | Margulis | 345/501 |

FOREIGN PATENT DOCUMENTS

| | | |
|---|---|---|
| JP | 11-15425 | 1/1999 |
| JP | 2001-166759 | 6/2001 |
| JP | 2001-195341 | 7/2001 |
| JP | 2001-356753 | 12/2001 |
| JP | 2003-163816 | 6/2003 |
| JP | 2004-007389 | 1/2004 |
| JP | 2004-015104 | 1/2004 |
| JP | 2004-102027 | 4/2004 |
| JP | 2004-102063 | 4/2004 |
| KR | 2003-0088420 | 11/2003 |
| KR | 2004-0087556 | 10/2004 |

OTHER PUBLICATIONS

PCT International Search Report dated Feb. 21, 2006.

* cited by examiner (a)

(b)

REPEATER APPARATUS TO PROVIDE A SOURCE APPARATUS WITH FORMAT INFORMATION THAT CAN BE PROCESSED BY BOTH A SINK APPARATUS AND THE REPEATER APPARATUS AND METHOD FOR CONTROLLING THE SAME

TECHNICAL FIELD

The present invention relates to repeater apparatuses having interfaces for transmitting digital video and audio signals, and relaying video/audio signals to construct a home network.

BACKGROUND ART

In recent years, mainly in the field of consumer video/sound equipment, general practice has been to connect an output apparatus such as a DVD player to a receiving apparatus such as a display via a network, and to view content, which is reproduced and outputted by the output apparatus, on the output apparatus.

As an interface standard for transmitting digital video and audio signals between the output apparatus and the receiving apparatus, a standard called "High-Definition. Multimedia Interface" (hereinafter, referred to as the "HDMI"; see Non-Patent Document 1) is established.

Because the HDMI standard makes it possible to transmit video and audio data in high-quality and uncompressed form, and the audio data is transmitted along with a video signal with a blanking period in which the audio data is superimposed (hereinafter, such a signal is referred to as the "HDMI signal"), the HDMI standard has advantages, for example, in that it is not necessary to separate an audio output terminal and a video output terminal as is required conventionally. Furthermore, the standard is expected to come into wide use in the future because the HDMI signal being transferred is encoded and thus copyright-protected.

In the HDMI, basically, a plurality of apparatuses are connected in series via cables conforming to the HDMI standard (hereinafter, referred to as the "HDMI cables"), and signals are transmitted between the apparatuses in one direction. The apparatuses are classified into three types:

(1) "Source" for transmitting signals (hereinafter, referred to as the "source apparatus");
(2) "Sink" for receiving signals (hereinafter, referred to as the "sink apparatus"); and
(3) "Repeater" disposed between the source apparatus and the sink apparatus and having abilities to receive and retransmit signals as well as, for example, a 1-input/1-output or multi input/multi output selector function for selecting the source apparatus or the sink apparatus (hereinafter, referred to as the "repeater apparatus").

Note that the repeater apparatus does not simply pass the signals therethrough, but has in itself abilities both as the sink apparatus and as the source apparatus, and functions for reproducing a video signal and an audio signal by decoding a received HDMI signal, and reconverting these signals into an HDMI signal before retransmission.

The repeater apparatus is not only used as a selector, but also can be used as one of the apparatuses for constructing a home theater system in which, for example, the repeater apparatus itself has an audio reproduction and output ability, allowing the repeater apparatus to output an audio signal, which is received from a source apparatus such as a DVD player, from its own audio reproduction equipment, and retransmit a video signal to a sink apparatus for displaying the signal on a display.

Note that the sink apparatus at least stores information called "Extended Display Identification Data" (hereinafter, referred to as the "EDID"; see Non-Patent Document 2) for defining formats of video and audio signals, and the source apparatus can reference the EDID information in the sink apparatus by reading it via a serial signal line called a "DDC" in the HDMI cable.

The EDID information is information concerning formats of video and audio signals that can be reproduced after being received by the sink apparatus. By using the EDID information, the source apparatus can transmit a signal after automatically determining an optimal format of the signal in accordance with the sink apparatus connected thereto.

For example, when the EDID information indicates THAT "THE FORMAT OF THE VIDEO SIGNAL IS COMPATIBLE WITH 480P and 1080i, and the format of the audio signal is a linear PCM 2-channel format and compatible with sampling frequencies of up to 192 kHz", the source apparatus can operate in such a manner as "not to use 720p but to output audio of up to 192 kHz without limiting the audio at 48 kHz".

Accordingly, in order to ensure the aforementioned mechanism, the repeater apparatus is required to perform control in such a manner that the EDID information in the sink apparatus connected thereto can be referenced by the source apparatus as EDID information of the repeater apparatus itself.

Note that 480p, 1080i, and 720p as mentioned above denote video signal display formats, where numerals denote the number of scanning lines, p denotes progressive scanning mode, and i denotes interlaced scanning mode.

Non-Patent Document 1: "High-Definition Multimedia Interface Specification Version 1.1", 2004

Non-Patent Document 2: "ENHANCED EXTENDED DISPLAY IDENTIFICATION DATA STANDARD Release A, Revision 1 VESA,", 2002

DISCLOSURE OF THE INVENTION

Problem To be Solved by the Invention

In the above-described control by the repeater apparatus, i.e., the control for allowing the source apparatus to reference the EDID information in the sink apparatus connected to the repeater apparatus as the EDID information of the repeater apparatus itself, when receiving and transmitting an HDMI signal, the repeater apparatus might not be able to process part of the formats that can be processed by the connected sink apparatus because of constraints of employed devices such as LSIs.

In such a case, if the EDID information in the sink apparatus is used without any modification as the EDID information of the repeater apparatus itself, the repeater apparatus cannot process a signal outputted based on EDID information referenced by the source apparatus, and therefore there arises a situation where video and audio signals cannot be transmitted in a format that can be processed by the sink apparatus.

The present invention aims to solve the above traditional problem and provide a repeater apparatus capable of presenting, to the source apparatus, information regarding formats that can be processed by both the sink apparatus and the repeater apparatus.

Means for Solving the Problem

To attain the above object, the present invention provides a repeater apparatus comprising:

a receiving part for decoding video and audio signals in a predetermined format that have been encoded by a source apparatus;

a transmitting part for re-encoding at least the video signal out of the decoded video and audio signals for transmission to a sink apparatus; and a control part for controlling operations of the receiving part and the transmitting part, and storing information into memory, the information being acquired from the sink apparatus and defining a plurality of formats that can be processed by the sink apparatus, wherein the control part newly sets a format that can be processed by the repeater apparatus, the newly set format being an overlap between the formats that can be processed by the sink apparatus and formats that can be processed by the repeater apparatus, and the control part replaces the format defining information stored in the memory with information defining the newly set format.

The repeater apparatus of the present invention may further comprise an audio reproducing part having at least an audio signal processing part and an amplifier part, the audio signal decoded by the receiving part may be inputted to the audio reproducing part so as to be reproduced as audio, and the video signal decoded by the receiving part may be inputted to the transmitting part so as to be re-encoded and transmitted to the sink apparatus.

Also, a soundless audio signal may be generated by the audio signal processing part, and transmitted to the sink apparatus after being encoded by the transmitting part, along with the video signal.

In addition, in the repeater apparatus of the present invention, it is preferred that the receiving part is capable of receiving a signal conforming to an HDMI standard, and the transmitting part is capable of transmitting the signal conforming to the HDMI standard. Also, it is preferred that the information defining the formats of the video and audio signals is information conforming to an EDID standard.

In addition, the present invention provides a method for controlling the repeater apparatus, which is a repeater apparatus controlling method for decoding video and audio signals in a predetermined format that have been encoded by a source apparatus, and thereafter re-encoding the signals for transmission to a sink apparatus, wherein for at least one of the video and audio signals, information defining a plurality of formats that can be processed by the sink apparatus is acquired from the sink apparatus, and the acquired information and information defining formats that can be processed by a repeater apparatus are analyzed to set an overlapping format as a new format that can be processed by the repeater apparatus.

Effect of the Invention

The repeater apparatus of the present invention is capable of allowing the source apparatus to recognize only video and audio signal formats falling within the range that can be processed by the repeater apparatus based on whatever ability owned by a sink apparatus connected thereto, and therefore the source apparatus can output a signal after automatically determining an optimal format in accordance with the ability of the sink apparatus.

BEST MODE FOR CARRYING OUT THE INVENTION

Hereinafter, embodiments of the present invention will be described with reference to the drawings.

Embodiment 1

Figure 1:
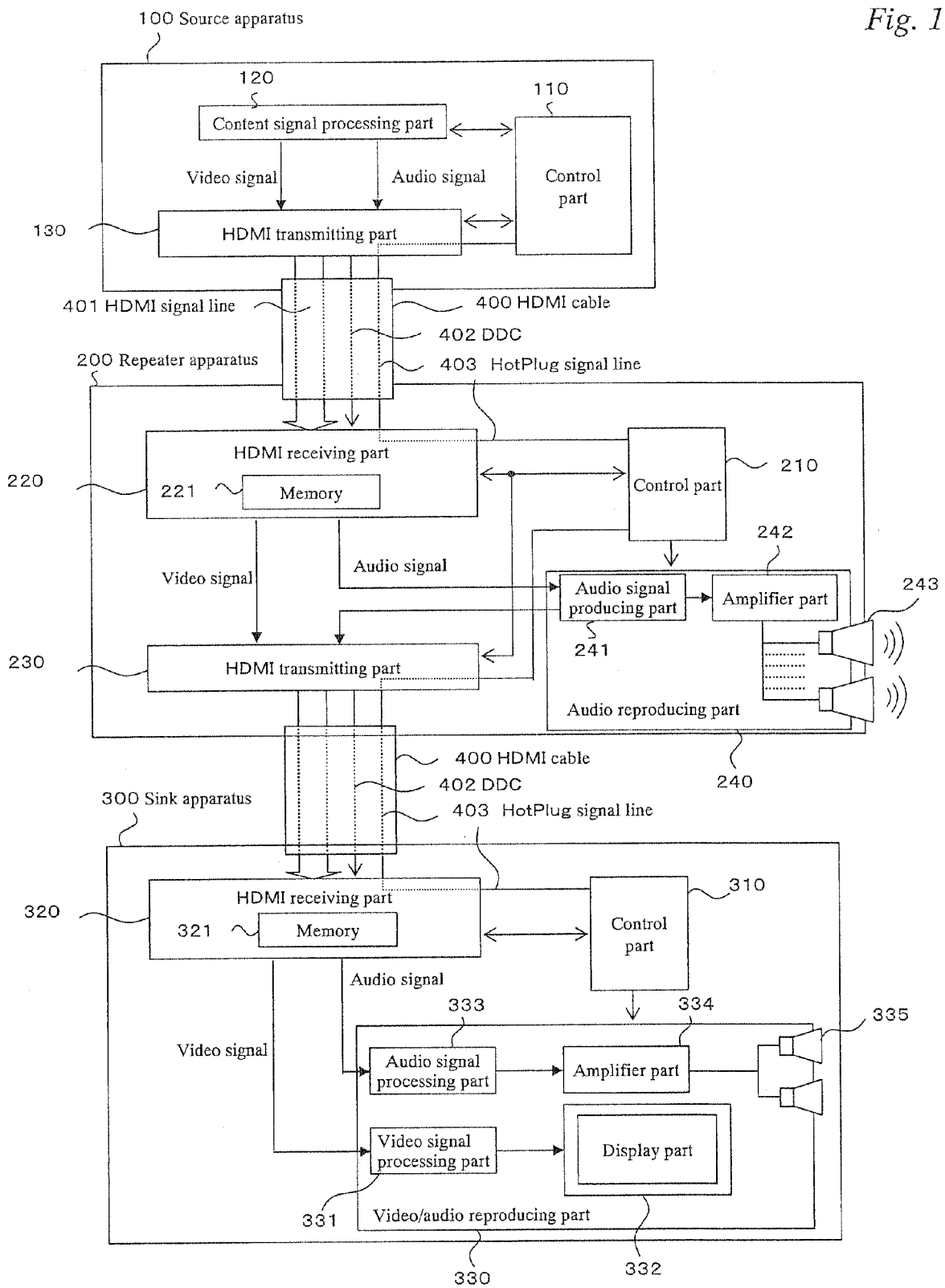
FIG. 1 is a block diagram illustrating a configuration of a home theater system in Embodiment 1 of the present invention.

FIG. 1 is a block diagram illustrating a configuration of a home theater system using a repeater apparatus according to Embodiment 1 of the present invention.

The home theater system includes a source apparatus 100, a repeater apparatus 200, and a sink apparatus 300, such that the repeater apparatus 200 is disposed between the source apparatus 100 and the sink apparatus 300, and these apparatuses are connected via interfaces for transmitting digital video and audio signals, specifically, the interfaces conforming to the HDMI standard. Regarding video and audio signals transmitted from the source apparatus 100 in the present embodiment, the video signal is displayed on a display part of the sink apparatus 300, and the audio signal is outputted as audio in, for example, 5.1-ch surround system, from an audio reproducing part of the repeater apparatus 200.

The configuration and operation of each apparatus will be described below.

The source apparatus 100 includes a control part 110, a content signal processing part 120 and an HDMI transmitting part 130. Video and audio signals outputted from an optical disk or the like are subjected to, for example, data decompression in the content signal processing part 120 in accordance with control by the control part 110, and in the HDMI transmitting part 130, the audio signal is superimposed on the video signal, and encoded to become an HDMI signal, which is thereafter transmitted to the repeater apparatus 200 via an HDMI cable 400.

The repeater apparatus 200 includes a control part 210, an HDMI receiving part 220, an HDMI transmitting part 230, and an audio reproducing part 240, and the HDMI receiving part 220, the HDMI transmitting part 230 and the audio reproducing part 240 are each controlled by the control part 210.

The HDMI signal transmitted from the source apparatus 100 is decoded into a video signal and an audio signal by the HDMI receiving part 220.

Of these signals, the audio signal is outputted as audio from the audio reproducing part 240 included in the repeater apparatus 200. The audio reproducing part 240 includes an audio signal processing part 241, an amplifier part 242, and external loudspeakers 243. In the case of reproduction in, for example, 5.1-ch surround system, the audio signal processing part 241 performs necessary processing on the audio signal, and thereafter the amplifier part 242 amplifies the audio signal, which is outputted from the external loudspeakers 243.

On the other hand, the video signal, along with the audio signal generated by the audio signal processing part 241 for retransmission, is inputted to the HDMI transmitting part 230, where the signals are reconverted into an HDMI signal, which is thereafter transmitted to the sink apparatus 300.

The sink apparatus 300 includes a control part 310, an HDMI receiving part 320, and a video/audio reproducing part 330, and the HDMI receiving part 320 and the video/audio reproducing part 330 are controlled by the control part 310. The video signal inputted to and decoded by the HDMI receiving part 320 is processed by a video signal processing part 331, and thereafter displayed on a display part 332.

Note that an audio signal processing part 333, an amplifier part 334 and internal loudspeakers 335 of the video/audio reproducing part 330 are used for reproducing audio in the sink apparatus 300, and are functionally the same as the audio signal processing part 241, the amplifier part 242 and the external loudspeakers 243, respectively, of the repeater apparatus 200, but in the present embodiment, audio reproduction is performed by the external loudspeakers 243 of the repeater apparatus 200, and therefore their descriptions will be omitted herein.

The source apparatus 100 and the repeater apparatus 200 are connected by an HDMI cable 300, and the repeater apparatus 200 and the sink apparatus 300 are connected by another HDMI cable 300. The HDMI cable 300 includes at least an HDMI signal line 401, a DDC 402, and a HotPlug signal line 403. The HDMI signal line 401 is used for transferring the HDMI signal on which a video signal and an audio signal are superimposed. The DDC 402 is used for transferring the EDID information, which is information defining formats of the video and audio signals. The HotPlug signal line 403, on the other hand, is connected to the control part of each apparatus via the HDMI transmitting part and the HDMI receiving part. When the apparatuses are connected by the HDMI cable and the EDID information in the sink apparatus is in a readable state, a High signal is applied, whereas when the apparatuses are disconnected, a Low signal is applied.

In the present embodiment, the repeater apparatus 200 and the sink apparatus 300 include memory 221, 321 in the EDID receiving part 220, 320, and the memory has stored therein EDID information defining video and audio signal formats. In addition, the control part 210 of the repeater apparatus 200 has functions of: reading EDID information defining video and audio signal formats that can be processed by the sink apparatus 300 from the memory 321 of the sink apparatus 300 via the DDC 402; and analyzing and editing the read EDID information and the EDID information that is stored in the memory 221 of the repeater apparatus 200, thereby reconstructing the EDID information, which is stored to the memory 221.

The control part 110 of the source apparatus 100, on the other hand, recognizes formats that can be processed by the apparatuses connected to the source apparatus 100 by reading and referencing the EDID information from the memory 221 of the repeater apparatus 200 via the DDC 402, and the recognized formats are used as criteria to decide formats of video and audio signals that are to be transmitted. The EDID information that is to be stored in the memory 221 is written by the control part 210 of the repeater apparatus 200.

Figure 2:
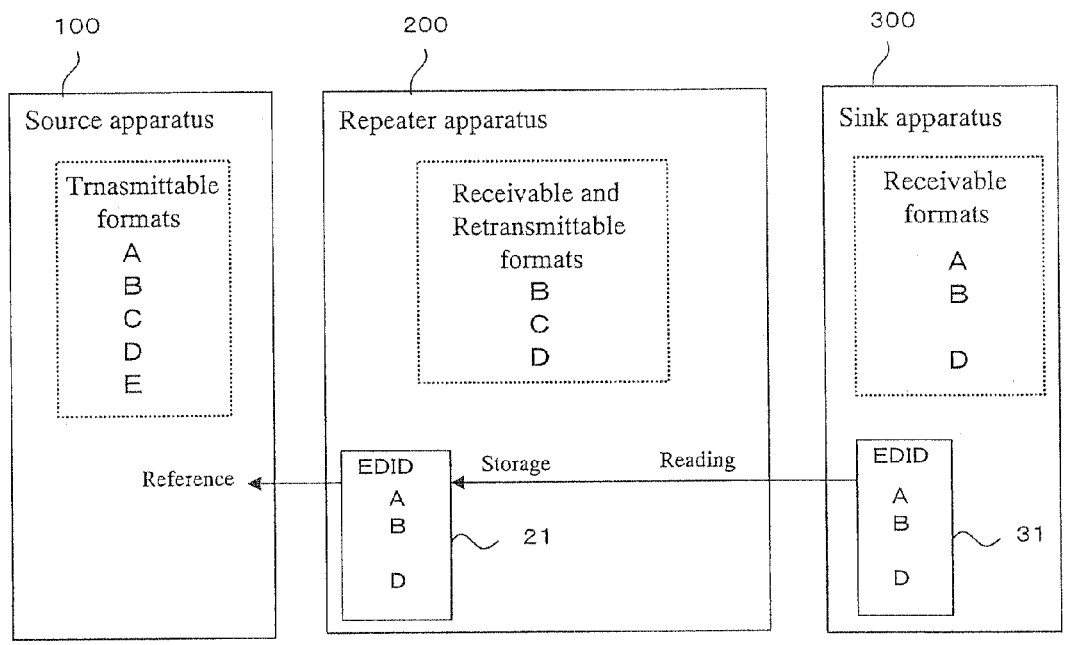
FIG. 2 is an explanatory diagram illustrating video signal formats that can be processed by each apparatus in Embodiment 1.
Figure 2:
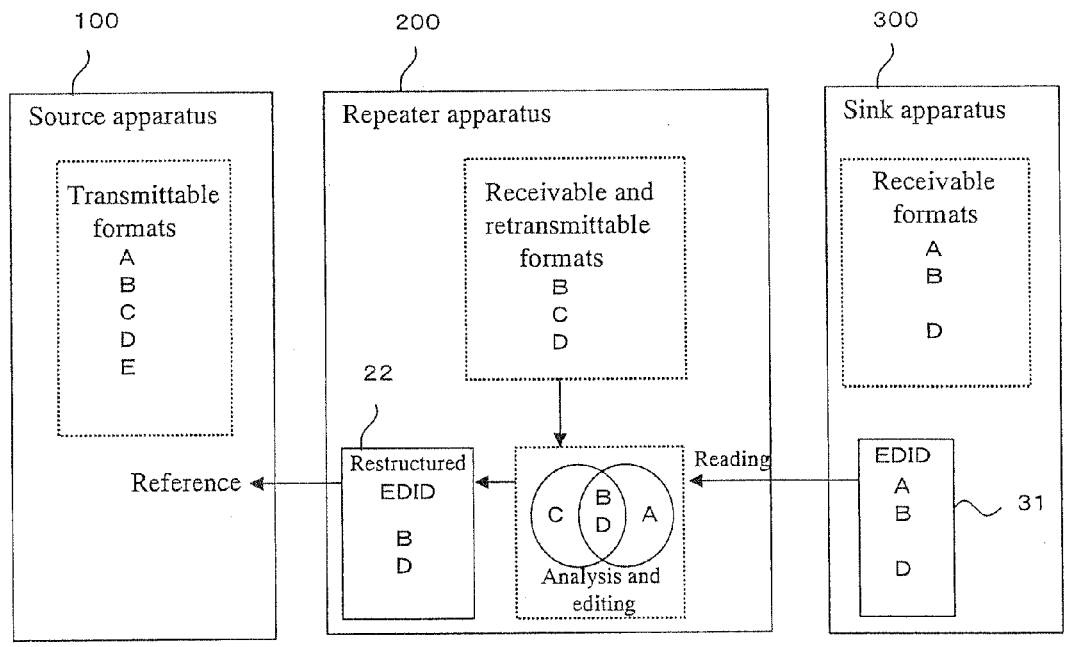

FIG. 2 illustrates video signal formats that can be processed by each of the source apparatus 100, the repeater apparatus 200 and the sink apparatus 300. In the present embodiment, the source apparatus 100 can process five formats A, B, C, D and E, the repeater apparatus 200 can process three formats B, C and D, and the sink apparatus 300 can process three formats A, B and D.

In the case where the format A is, for example, 1080i, "being capable of processing the format A" means that, as for the source apparatus 100, the content signal processing part 120 can reproduce a video signal from a recording medium, such as an optical disk, in 1080i format. In addition, it means that, as for the repeater apparatus 200, the HDMI receiving part 220 can reproduce an HDMI signal, which is transmitted from the source apparatus 100, as a video signal in 1080i format, and thereafter the HDMI transmitting part 230 can reconvert the video signal into an HDMI signal for transmission. Also, it means that, as for the sink apparatus, the HDMI receiving part 320 can reproduce an HDMI signal, which is transmitted from the repeater apparatus 200, as a video signal in 1080i format, which is thereafter displayed on the display part 332.

Regarding the information that is to be stored to the memory 221 of the repeater apparatus 200, in the case as shown in (a) of FIG. 2, where EDID information 31, which is stored in the memory 321 of the sink apparatus 300 and defines the formats A, B and D, is stored to the memory 221 as EDID information 21 of the repeater apparatus 200 without any modification, the source apparatus 100 recognizes the repeater apparatus 200 connected thereto as being capable of processing the format A, despite the fact that the repeater apparatus 200 cannot process the format A.

Therefore, as shown in (b) of FIG. 2, the control part 210 of the repeater apparatus 200 reads and analyzes the EDID information 31 of the sink apparatus 300, and performs an edit to delete EDID information regarding the format A that cannot be processed by the repeater apparatus 200, thereby reconstructing and changing the EDID information into information defining the formats B and D that can be handled by both the repeater apparatus 200 and the sink apparatus 300, the information being used as EDID information 22 of the repeater apparatus 200, so that the source apparatus 100 can recognize that the apparatus connected thereto cannot handle the format A.

Figure 3:
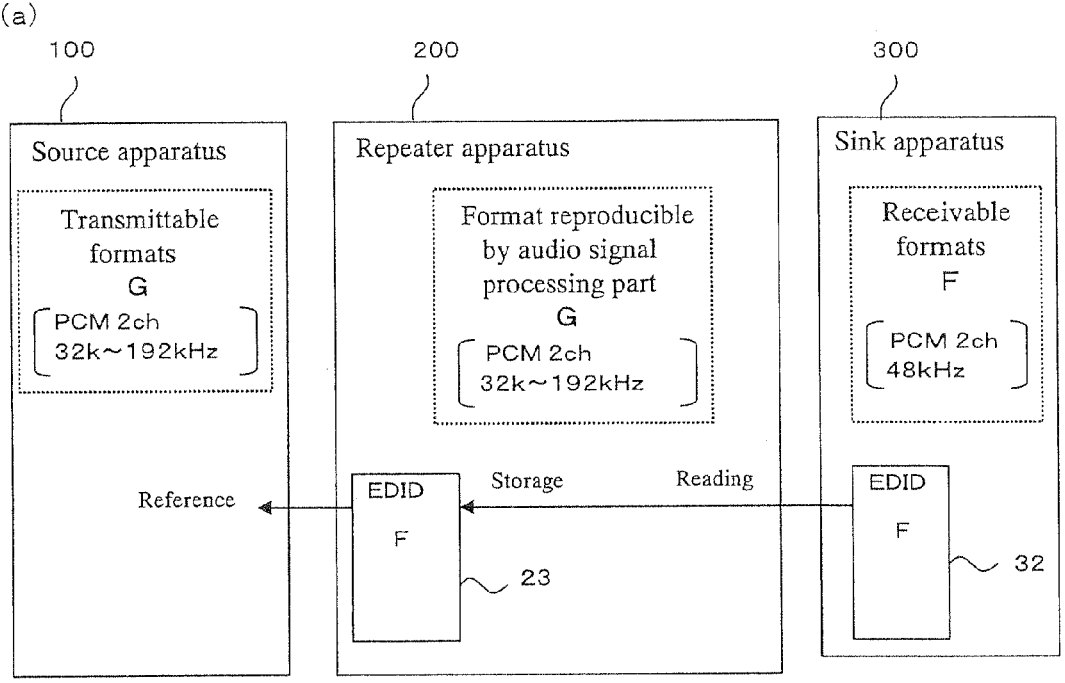
FIG. 3 is an explanatory diagram illustrating audio signal formats that can be processed by each apparatus in Embodiment 1.
Figure 3:
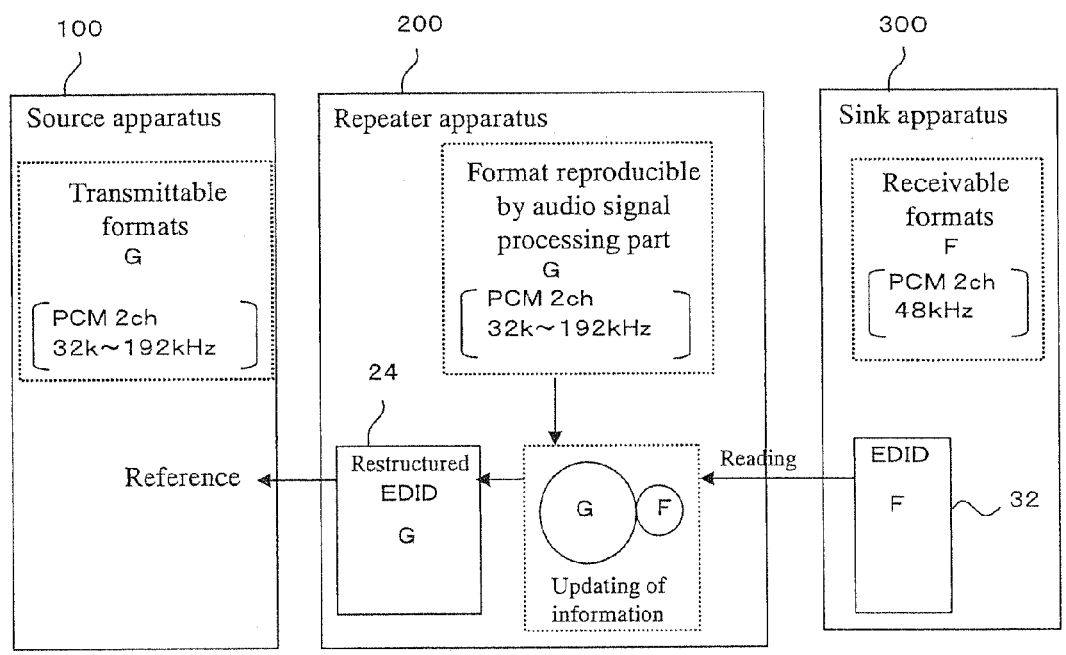

Next, FIG. 3 illustrates audio signal formats that can be processed by each of the source apparatus 100, the repeater apparatus 200 and the sink apparatus 300. In the present embodiment, the source apparatus 100 and the repeater apparatus 200 can process a PCM 2-CH format G with a sampling frequency from 32 to 192 kHz, and the sink apparatus 300 can process a PCM 2-CH format F with a sampling frequency of 48 kHz.

In the present embodiment, audio reproduction is performed by the audio reproducing part 240 of the repeater apparatus 200, and therefore after the source apparatus 100 reproduces an audio signal stored in an optical disk or the like at a sampling frequency supported by the format G, the HDMI transmitting part 130 converts the reproduced signal to an HDMI signal and transmits the HDMI signal to the repeater apparatus 200. In the repeater apparatus 200, the HDMI receiving part 220 decodes the inputted HDMI signal to reproduce the audio signal, and the external loudspeakers 243 of the audio reproducing part 240 reproduce audio.

As shown in (a) of FIG. 3, the format F that can be processed by the sink apparatus 300 is a PCM 2CH format with a sampling frequency of 48 kHz, and therefore if EDID information 32 of the sink apparatus 300 is stored as EDID information 23 of the repeater apparatus 200 without any modification as in the case of (a) of FIG. 2, transmission from the source apparatus 100 is performed only in the format F, despite the fact that the format G that can be processed by the repeater apparatus 200 is a PCM 2-CH format with a sampling frequency from 32 to 192 kHz.

Therefore, as shown in (b) of FIG. 3, even if the repeater apparatus 200 recognizes the EDID information 32 of the sink apparatus 300, the repeater apparatus 200 stores information defining the format G as HDMI information 24 of the repeater apparatus itself for reference by the source apparatus 100. The source apparatus 100 recognizes that the EDID information defining the format G is stored in the memory 221, and reproduces the audio signal in the format G, so that audio reproduction can be performed fully utilizing the ability of the audio reproducing part 240 of the repeater apparatus 200.

As described above, the control part 210 of the repeater apparatus 200 reads the EDID information from the memory 321 of the sink apparatus 300, and analyzes and edits the information in accordance with the methods as shown in FIGS. 2 and 3 to reconstruct the information before storing the information to the memory 221 as the EDID information of the repeater apparatus 200 itself, thereby making it possible to allow the source apparatus 100 to recognize video formats that can be processed by both the repeater apparatus 200 and the sink apparatus 300.

Figure 4:
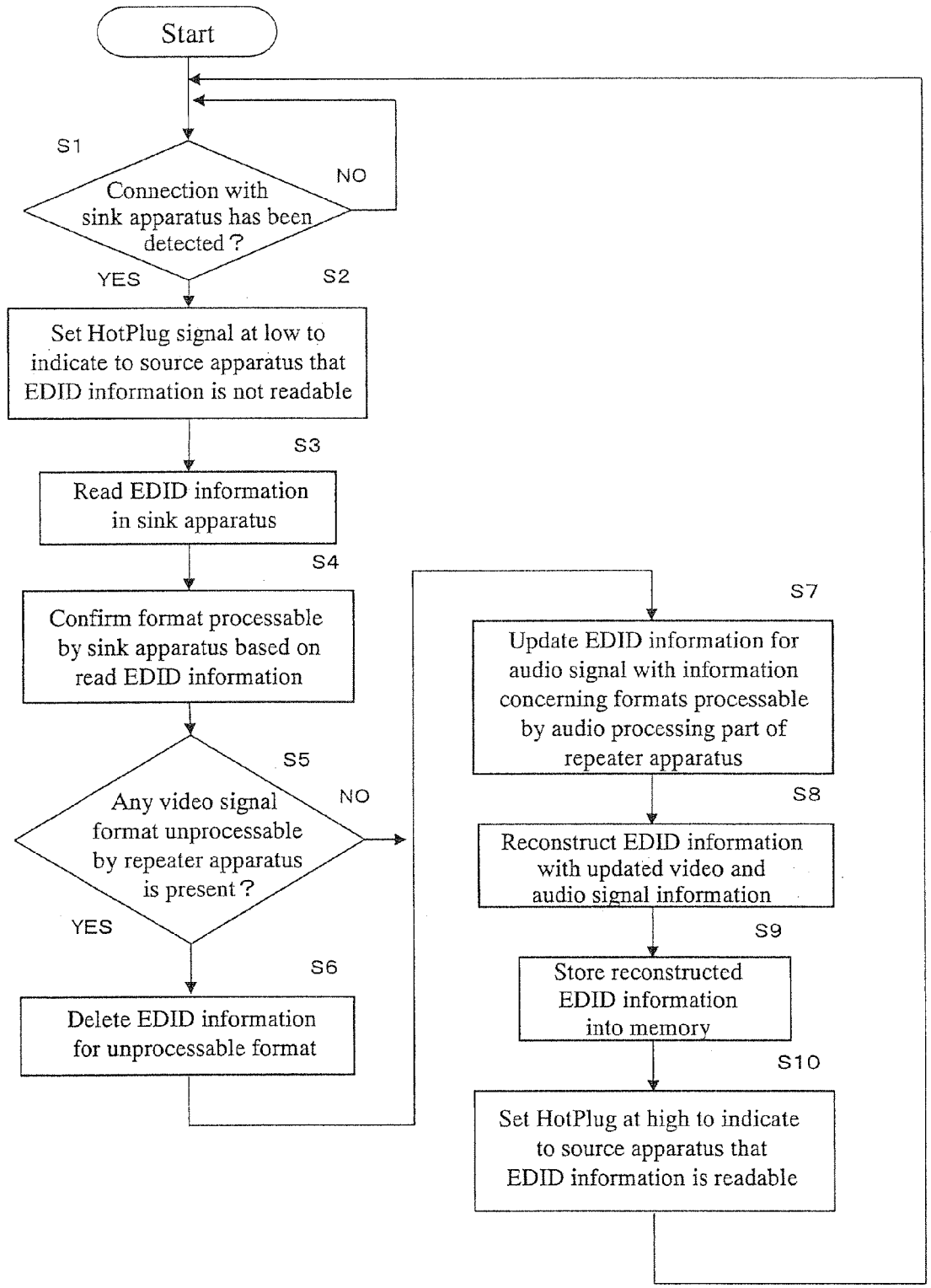
FIG. 4 is a flowchart illustrating a process for editing EDID information in Embodiment 1.

FIG. 4 is a flowchart illustrating a process for editing the EDID information in the repeater apparatus 200. The editing of the EDID information will be described below with reference to FIG. 4.

Initially, the control part 210 of the repeater apparatus 200 detects that the sink apparatus 300 is connected via the HotPlug signal line 403 (step S1). Upon detection of the connection with the sink apparatus 300 (YES in S1), the control part 210 sets the HotPlug signal line 15 at Low level, and notifies the source apparatus 100 that reading the EDID information in the repeater apparatus 200 is not allowed because there is a possibility that the EDID information might be changed (S2). Thereafter, pieces of EDID information 31 and 32 regarding video and audio signals are read from the memory 321 of the sink apparatus 300 (S3), and analyzed to confirm video and audio signal formats that can be processed by the sink apparatus 300 (S4).

Next, when the video signal formats that can be processed by the sink apparatus 300 include any format that cannot be processed by the repeater apparatus 200 (YES in S5), corresponding EDID information is deleted (S6). When any format that cannot be processed by the repeater apparatus 200 is not included (NO in S5) or after the EDID information is edited in step S6, the control part 210 updates the EDID information concerning the audio signal formats to information concerning the formats that can be processed by the audio reproducing part 240 of the repeater apparatus 200 (S7). The control part 210 reconstructs the EDID information with the thus-updated information regarding video and audio signal formats to generate pieces of EDID information 22 and 24 (S8), which are stored to the memory 221 of the repeater apparatus 200 (S9).

Lastly, the control part 210 brings the HotPlug signal line 403 back to High level in order to notify the control part 110 of the source apparatus 100 that the EDID Information in the repeater apparatus 200 has become readable (S11). Thereafter, each time the connection status of the sink apparatus 300 is changed, the processing will be executed from step S1.

Note that in the present embodiment, since the repeater apparatus 200 reproduces the audio signal, and the sink apparatus 300 reproduces only the video signal, the repeater apparatus 200 is not required to transmit the audio signal to the sink apparatus 300. In such a case, it is typical to instruct the control part 310 of the sink apparatus 300 to mute the output from the amplifier part 334 in order not to reproduce audio from the loudspeakers 335, but it is also possible to provide a changer-over switch (not shown) in the audio signal processing part 241 of the repeater apparatus 200, so that the control part 210 can command the audio signal processing part 241 to operate the change-over switch so as to output the audio signal as a soundless signal.

Thus, according to the present embodiment, when the sink apparatus reproduces a video signal, it is possible to provide the source apparatus with EDID information defining formats that can be processed by both the sink apparatus and the repeater apparatus, and therefore the source apparatus can automatically determine an optimal format from the formats that can be processed by the repeater apparatus and the sink apparatus that are connected to the source apparatus, whereby the source apparatus can output the video signal in accordance with that format.

Embodiment 2

Figure 5:
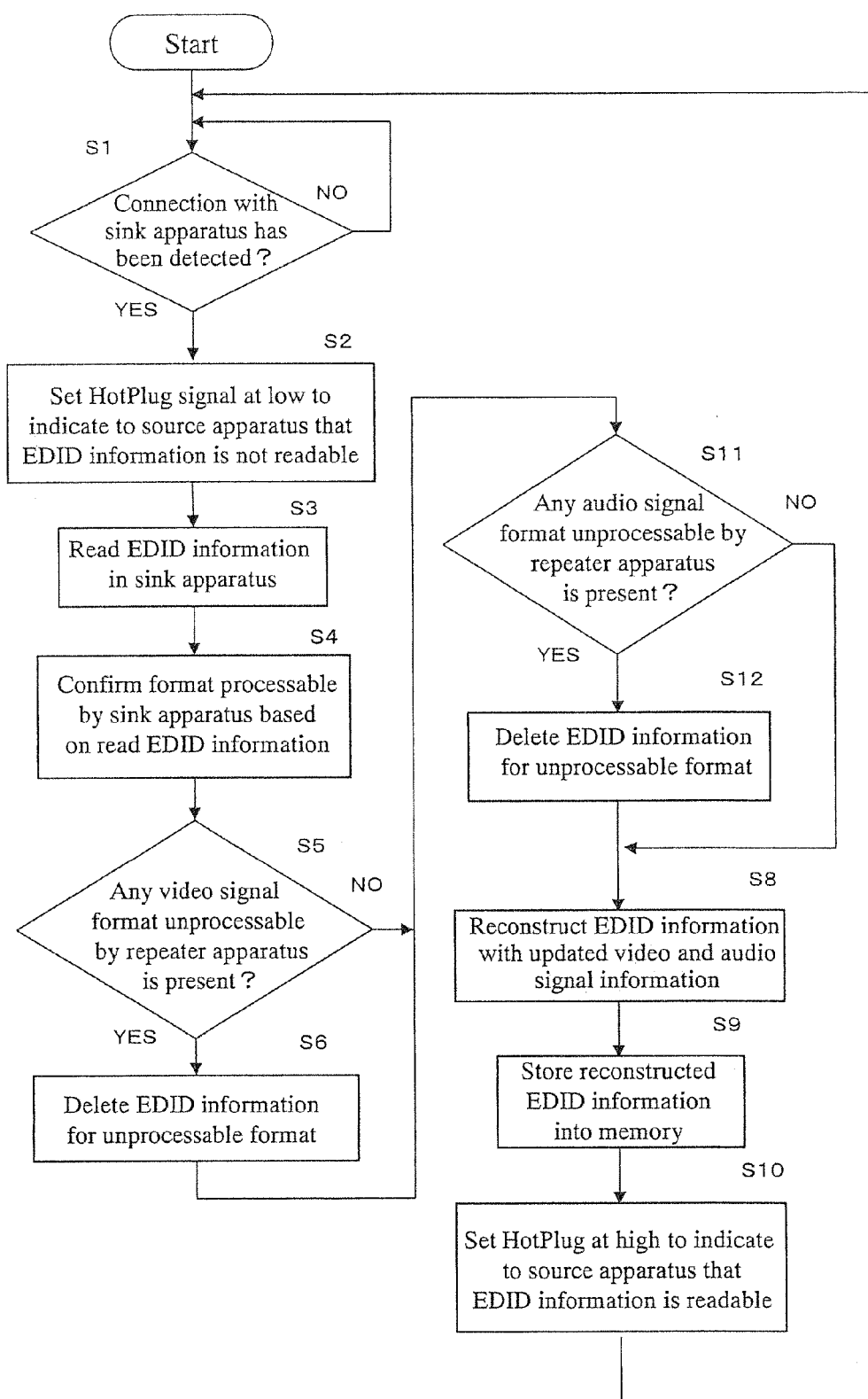
FIG. 5 is a flowchart illustrating a process for editing EDID information in Embodiment 2 of the present invention.

FIG. 5 is a flowchart illustrating a process for editing the EDID information in a repeater apparatus according to Embodiment 2 of the present invention. The present embodiment differs from Embodiment 1 in that audio is reproduced from the internal loudspeakers 335 of the sink apparatus 300, rather than from the external loudspeakers 243 of the repeater apparatus 200. Because other features are similar to those in Embodiment 1, and the configuration of the home theater system is not changed from that shown in FIG. 1, the operation of the present embodiment will be described with reference to FIGS. 1 and 5.

In FIG. 5, steps for performing the same processing as that in FIG. 4 are denoted by the same characters. Features different from those in FIG. 4 are steps S11 and S12 that are added in place of step S7 between steps S6 and S8 of FIG. 4.

Initially, the control part 210 of the repeater apparatus 200 detects that the sink apparatus 300 is connected via the HotPlug signal line 403 (step S1). Upon detection of the connection with the sink apparatus 300 (YES in S1), the control part 210 sets the HotPlug signal line 15 at Low level, and notifies the source apparatus 100 that reading the EDID information in the repeater apparatus 200 is not allowed because there is a possibility that the EDID information might be changed (S2). Thereafter, pieces of EDID information 31 and 32 regarding video and audio signals are read from the memory 321 of the sink apparatus 300 (S3), and analyzed to confirm video and audio signal formats that can be processed by the sink apparatus 300 (S4).

In step S5, when the video signal formats that can be processed by the sink apparatus 300 include any format that cannot be processed by the repeater apparatus 200 (YES in S5), the control part 210 deletes corresponding EDID information (S6). The processing up to here is the same as that in FIG. 4.

Next, when the audio signal formats that can be processed by the sink apparatus 300 include any format that cannot be processed by the repeater apparatus 200 (YES in S11), the control part 210 deletes EDID information concerning the format that cannot be processed, as in the case of the video signal (S12). On the other hand, when there is no audio signal format that cannot be handled by the repeater apparatus 200, the EDID information is reconstructed with updated information defining the video and audio signal formats (S9), and stored to the memory 221 of the repeater apparatus 200.

Lastly, the control part 210 brings the HotPlug signal line 403 back to High level, and notifies the source apparatus 100 that the EDID information in the repeater apparatus 200 has become readable. Thereafter, each time the connection status of the sink apparatus 200 is changed, the processing will be executed from step S1.

In this manner, according to the present embodiment, when the sink apparatus reproduces not only the video signal but also the audio signal, it is possible to provide the source apparatus with EDID information defining video and audio signal formats that can be processed by both the sink apparatus and the repeater apparatus, and therefore the source apparatus can automatically determine an optimal format in accordance with the repeater apparatus and the sink apparatus that are connected to the source apparatus, so that the source apparatus can output the video and audio signals in accordance with that format.

Note that video and audio signal formats, EDID information defining the video and audio signal formats, interface forms, etc., as described in the above embodiments are illustrative, and are not to be construed as restrictive.

Also, in the above embodiments, the memory for storing the EDID information is provided in the HDMI receiving part, but this is not restrictive and it may be provided in, for example, the control part.

In addition, in Embodiment 1, the repeater apparatus includes means for reproducing audio, and transmits the video signal to the sink apparatus, but on the other hand, it is also possible that the repeater apparatus itself includes means for reproducing video, such as a display, and transmits the audio signal to the sink apparatus. In such a case, when the audio signal is transmitted to the sink apparatus, it is necessary to transmit the video signal at the same time because the audio signal uses a clock of the video signal, and the video signal may be a black screen signal, for example.

INDUSTRIAL APPLICABILITY

The repeater apparatus of the present invention eliminates the necessity of any digital signal reception/transmission LSIs that support all video signal formats, and also eliminates the necessity of converting video and audio signal formats within the repeater apparatus. Furthermore, whatever sink apparatus is connected, the repeater apparatus makes it possible to allow the source apparatus to recognize processable video and audio signal formats, and therefore is capable of wide industrial applicability.

The invention claimed is:

1. A repeater apparatus comprising:
   a receiving part for decoding video and audio signals in a predetermined format that have been encoded by a source apparatus;
   a transmitting part for re-encoding at least the video signal out of the decoded video and audio signals for transmission to a sink apparatus;
   an audio reproducing part having an audio signal processing part and an amplifier part; and
   a control part for controlling operations of the receiving part, the transmitting part and the audio reproducing part, and storing information into memory, the information being acquired from the sink apparatus and defining a plurality of formats that can be processed by the sink apparatus,
   wherein the control part newly sets a video signal format that can be processed by the repeater apparatus, the newly set video signal format being an overlap between video signal formats that can be processed by the sink apparatus and video signal formats that can be processed by the repeater apparatus; the control part sets an audio signal format that can be processed by the repeater apparatus regardless of a format acquired from the sink apparatus; the control part replaces the format defining information stored in the memory with information defining the newly set format; the audio signal decoded by the receiving part is inputted to the audio reproducing part so as to be reproduced as audio; and the video signal decoded by the receiving part is inputted to the transmitting part so as to be re-encoded and transmitted to the sink apparatus.

2. The repeater apparatus according to claim 1, wherein a soundless audio signal is generated by the audio signal processing part, and transmitted to the sink apparatus after being encoded by the transmitting part, along with the video signal.

3. The repeater apparatus according to claim 1, wherein the receiving part is capable of receiving a signal conforming to an HDMI standard, and the transmitting part is capable of transmitting the signal conforming to the HDMI standard.

4. The repeater apparatus according to claim 1, wherein the information defining the formats of the video and audio signals is information conforming to an EDID standard.

5. A repeater apparatus controlling method for decoding video and audio signals in a predetermined format that have been encoded by a source apparatus, and thereafter re-encoding the video and audio signals for transmission to a sink apparatus, the method comprising:
   acquiring, from the sink apparatus, information defining a plurality of formats for the video and audio signals that are configured to be processed by the sink apparatus,
   analyzing the acquired information and information defining formats for the video and audio signals that are configured to be processed by a repeater apparatus,
   setting a video signal format to be processed by the repeater apparatus, the set video signal format being an overlap between video signal formats that are configured to be processed by the sink apparatus and video signal formats that are configured to be processed by the repeater apparatus,
   setting an audio signal format to be processed by the repeater apparatus regardless of the acquired information, and
   reproducing the audio signal as audio by an audio reproducing part included in the repeater apparatus using the set audio signal format, and re-encoding and transmitting the video signal to the sink apparatus to be reproduced using the set video signal format.

6. The repeater apparatus controlling method according to claim 5, wherein the re-encoding and transmitting of the video signal to the sink apparatus further comprises encoding and transmitting a soundless audio signal, along with the video signal, to the sink apparatus.

7. The repeater apparatus controlling method according to claim 5, wherein the reproducing of the audio signal, and the re-encoding and transmitting of the video signal, respectively comprises reproducing and re-encoding and transmitting audio and video signals conforming to an HDMI standard.

8. The repeater apparatus controlling method according to claim 5, wherein the acquiring of the information defining the plurality of the formats for the video and audio signals comprises acquiring information conforming to an EDID standard.

* * * * *